United States Patent
Tsai et al.

(10) Patent No.: US 8,179,485 B2
(45) Date of Patent: May 15, 2012

(54) LIQUID CRYSTAL DISPLAY DEVICE

(75) Inventors: Cheng-Yeh Tsai, Hsin-Chu (TW);
Tai-Hsiang Huang, Hsin-Chu (TW);
Po-Lun Chen, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 215 days.

(21) Appl. No.: 12/774,224

(22) Filed: May 5, 2010

(65) Prior Publication Data
US 2011/0273638 A1   Nov. 10, 2011

(30) Foreign Application Priority Data
Dec. 15, 2009   (TW) ................................ 98142983 A (51) Int. Cl.
*G02F 1/133* (2006.01)
(52) U.S. Cl. .......................................... 349/33; 349/139
(58) Field of Classification Search .................... 349/33, 349/139, 141
See application file for complete search history.

(56) References Cited

U.S. PATENT DOCUMENTS

| | | | |
|---|---|---|---|
| 6,924,876 B2 | 8/2005 | Kubo et al. | |
| 7,342,632 B2 | 3/2008 | Miyachi et al. | |
| 7,369,204 B1 | 5/2008 | Choi et al. | |
| 8,045,117 B2 * | 10/2011 | Miyachi et al. | 349/141 |
| 2005/0185105 A1 | 8/2005 | Miyachi et al. | |
| 2008/0129901 A1 | 6/2008 | You et al. | |
| 2009/0079919 A1 * | 3/2009 | Niioka et al. | 349/113 |
| 2011/0234562 A1 * | 9/2011 | Hong et al. | 345/211 |

* cited by examiner

*Primary Examiner* — Eric Wong
(74) *Attorney, Agent, or Firm* — Chun-Ming Shih (57) ABSTRACT

A liquid crystal display device includes a first substrate, a second substrate, a first vertical electrode, a second vertical electrode, a first pixel electrode, a first counter electrode, and a liquid crystal layer. The second substrate is disposed to be opposite to the first substrate, the liquid crystal layer is interposed between the first and second substrates. The liquid crystal layer includes polymer stabilized positive blue phase liquid crystal. The first vertical electrode is at an inner side of the first substrate, and faces the second substrate. The second vertical electrode is at an inner side surface of the second substrate and faces the first vertical electrode. The second vertical electrode and the first vertical electrode have different electrical potentials thus form a vertical electric field perpendicular to the first substrate and the second substrate. The first pixel electrode is at the inner side of the first substrate and faces the second substrate. The first counter electrode is at an inner side of the first substrate. The first pixel electrode and the first counter electrode have different electrical potentials. The first pixel electrode and the first counter electrode provide a horizontal electric field parallel to the first substrate and the second substrate.

23 Claims, 10 Drawing Sheets

LIQUID CRYSTAL DISPLAY DEVICE

CROSS-REFERENCE TO RELATED APPLICATIONS

This application claims the right of priority based on Taiwan Patent Application No. 098142983 entitled "Liquid Crystal Display Device", filed on Dec. 15, 2009, which is incorporated herein by reference and assigned to the assignee herein.

BACKGROUND

1. Technical Field

The present invention relates to liquid crystal display devices, and in particular to a liquid crystal display device having a blue phase liquid crystal layer.

2. Related Art

Liquid crystal display devices have become the mainstream of development of display devices in recent years due to the advantages of low operation voltage, no radiation scattering, light weight and small size. Conventional liquid crystal display devices usually employ nematic crystal to change polarizing direction or status of the passing light, and employ a polarizer plate to convert the different polarizing status into bright/dark contrast for displaying; and thus the response time is relatively long.

On the other hand, response time of blue phase liquid crystal material is short, and thus the blue phase liquid crystal material begins to receive attention. Blue phase is liquid crystal phase between isotropic and cholesteric phase, and itself can be sorted into three phases: the first blue phase BPI, the second blue phase BPII, and the third blue phase BPIII. The third blue phase which has highest existing temperature is amorphous, and the first and second blue phases have cubic structure. Referring to FIGS. 1a to 1d, FIGS. 1a and 1b respectively illustrate the crystal lattice structure and disclination line of the first blue phase, and FIGS. 1c and 1d respectively illustrate the crystal lattice structure and disclination line of the second blue phase.

Figure 1A:
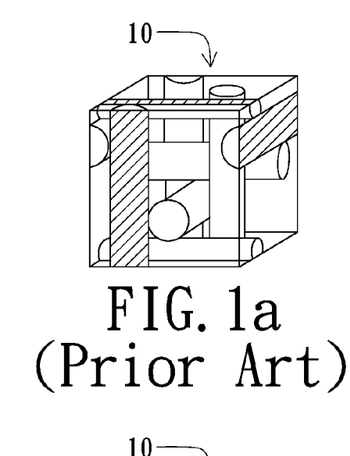
FIGS. 1a and 1b are schematic views respectively showing the crystal lattice structure and disclination line of the first blue phase.
Figure 1B:
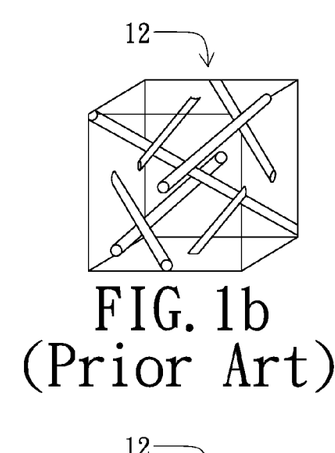
Figure 1C:
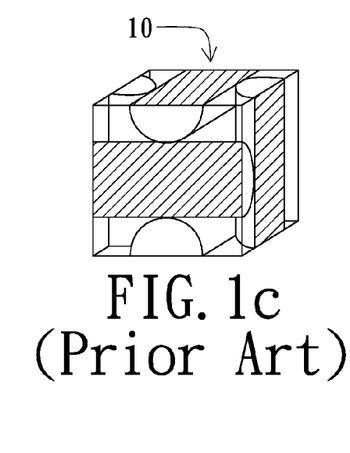
FIGS. 1c and 1d are schematic views respectively showing the crystal lattice structure and disclination line of the second blue phase.
Figure 1D:
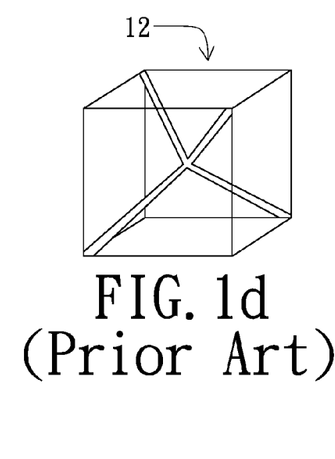

As shown in FIGS. 1a and 1b, the base unit of the lattice structure of the first blue phase and the second blue phase is double twist cylinder (DTC) 10. The double twist cylinders 10 are perpendicularly arranged in the space. In comparison, the first blue phase liquid crystal has a body-centered cubic (BCC) structure and the second blue phase liquid crystal has a simple cubic (SC) structure. The disclination line of the first blue phase liquid crystal and the second blue phase liquid crystal are shown in FIGS. 1c and 1d. Differing from nematic, smectic, isotropic and other liquid crystal phase, many colored platelet texture can be observed from the first blue phase liquid crystal and the second blue phase liquid crystal with polarizing microscope.

However, blue phase liquid crystal is unstable, and thus can only exist in a very narrow temperature range having a width of about 1° C. Therefore, blue phase liquid crystal can not be easily applied in a common apparatus. To increase the operation temperature range of the blue phase liquid crystal, conventional methods include adding reactive monomer or forming light curable polymer stabilized blue phase liquid crystal by changing the ingredient for synthesizing thereof, which can stabilize the blue phase.

Figure 2:
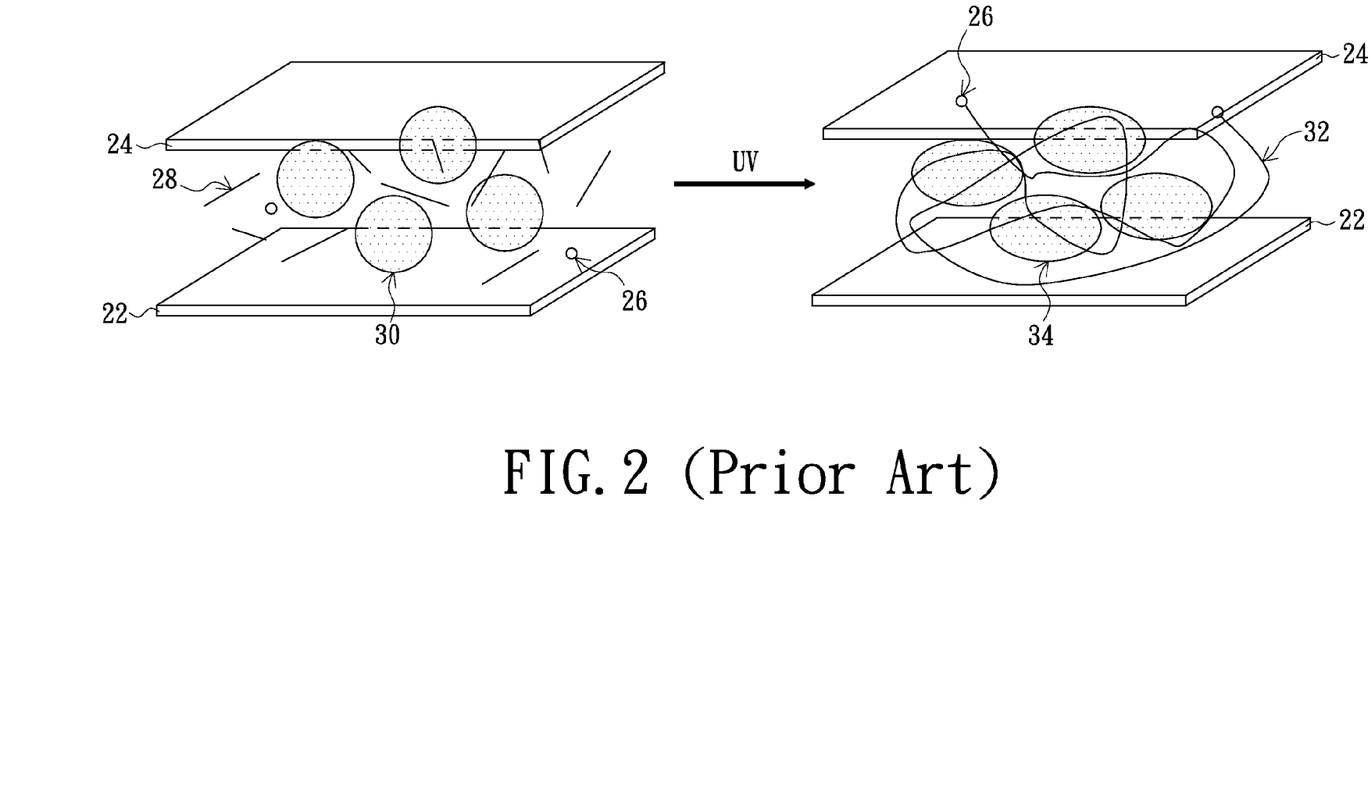
FIG. 2 is a schematic view showing a conventional method for forming polymer stabilized blue phase liquid crystal.

Referring to FIG. 2, which is a schematic view showing a conventional method for forming polymer stabilized blue phase liquid crystal. As shown in FIG. 2, first of all, the blue phase liquid crystal 30 is disposed between a thin film transistor array substrate 22 and a color filter substrate 24. Compared with the optically anisotropic characteristic of common nematic and smectic liquid crystal, the blue phase liquid crystal 30 is optically isotropic prior to the polymer stabilized blue phase liquid crystal is formed. In other words, the blue phase liquid crystal 30 almost has no the characteristic of birefringence. But at this time, the blue phase liquid crystal 30 can only exits in a very narrow temperature range, and it is not easy to apply it in to a practical product. To expand the existing temperature range of the blue phase liquid crystal, the conventional methods includes adding a little reactive monomer 28 and photoinitiator 26 into the blue phase liquid crystal liquid 30, and irradiating the liquid crystal liquid 30 with an ultraviolet light at the existing temperature range to perform a polymerizing reaction such that the macromolecule is polymerized on the disclination line thereby obtaining a polymer stabilized positive blue phase liquid crystal 34 having a gel-like structure. The blue phase of the polymer stabilized blue phase liquid crystal 34 can exist in a temperature range of 60° C.

Figure 3:
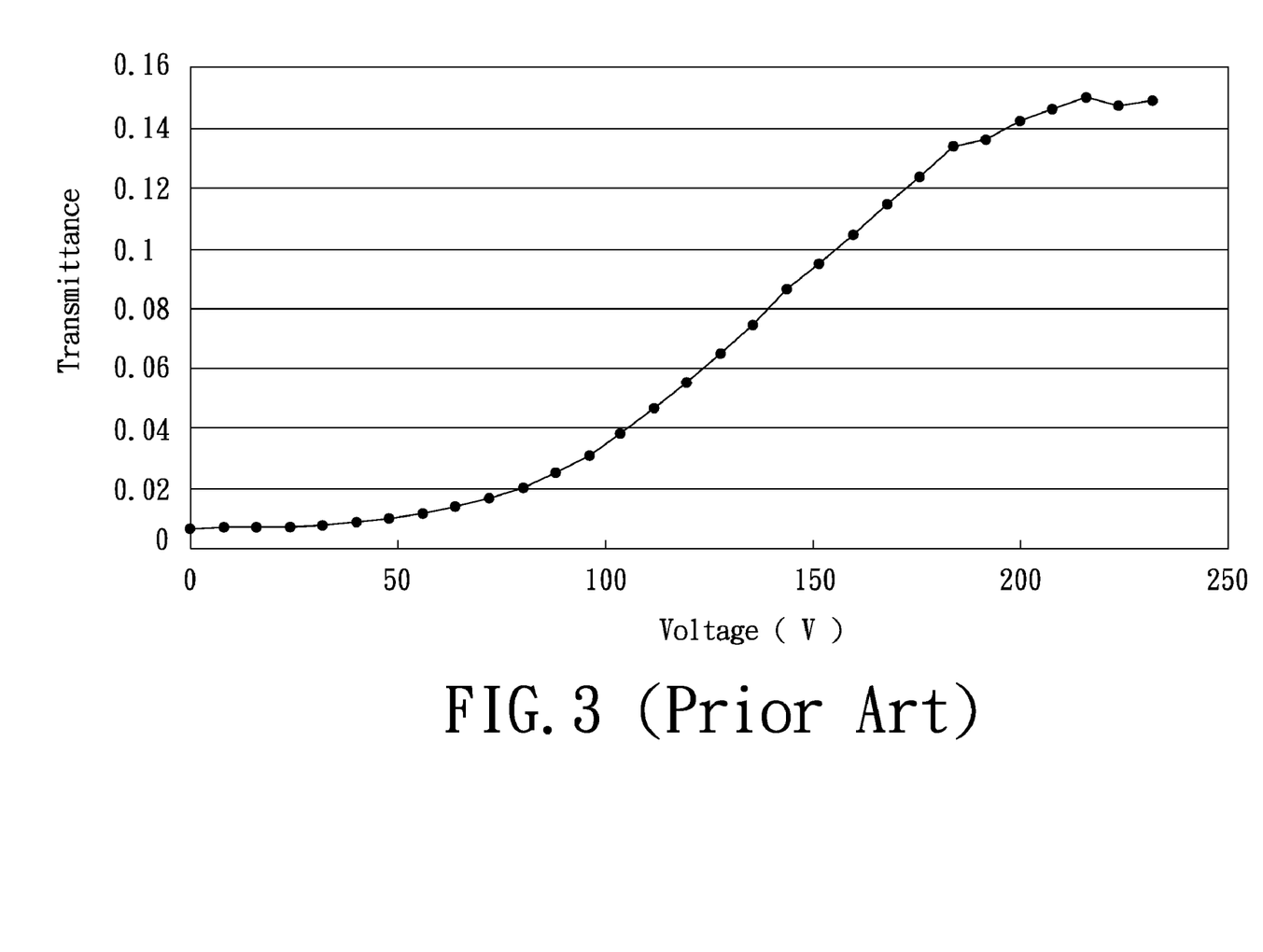
FIG. 3 is a schematic view showing a relation between the operation voltage and the transmittance of the conventional polymer stabilized positive blue phase liquid.

Ideally, when there is no electric applied the polymer stabilized positive blue phase liquid crystal 34 should demonstrate the characteristic of optically isotropic. However, in practice, conventional polymer stabilized positive blue phase liquid crystal 34 can not demonstrate perfect isotropic property when there is no voltage applied; that is, the birefringence rate is greater than zero ($\Delta n = n_{//} - n_{\perp} > 0$), and thus usually cause the problem of light leakage in dark state resulting in decreasing of the contrast ratio of display devices. Referring to FIG. 3, which is a schematic view showing a relation between the operation voltage and the transmittance of the conventional polymer stabilized positive blue phase liquid. As shown in FIG. 3, conventional blue phase liquid crystal display devices employ a horizontal electric field to drive the polymer stabilized positive blue phase liquid crystal. When the volts of the voltage applied is equal to zero, in other words, there is no voltage applied to the liquid crystal, the polymer stabilized positive blue phase liquid crystal still has a transmittance of 0.6%, which leads to the problem of light leakage in dark state and the contrast ratio can only reach to 23.

BRIEF SUMMARY

The present invention provides a liquid crystal display device, which is capable of solving the problem of light leakage in dark state of polymer stabilized positive blue phase liquid crystal.

The present invention provides a liquid crystal display device, which includes a first substrate, a second substrate, a first vertical electrode, a second vertical electrode, a first pixel electrode, a first counter electrode, and a liquid crystal layer. The second substrate is disposed to be opposite to the first substrate, the liquid crystal layer is interposed between the first and second substrates. The liquid crystal layer includes polymer stabilized positive blue phase liquid crystal. The first vertical electrode is at an inner side of the first substrate, and faces the second substrate. The second vertical electrode is at an inner side surface of the second substrate and faces the first vertical electrode. The second vertical electrode and the first vertical electrode have different electrical potentials thus form a vertical electric field perpendicular to the first substrate and the second substrate. The first pixel electrode in at an inner side of the first substrate and faces the second substrate. The first counter electrode is at an inner side of the first substrate. The first pixel electrode and the first counter electrode have different electrical potentials. The first pixel electrode and the first counter electrode provide a horizontal electric field parallel to the first substrate and the second substrate.

The present invention also provides a liquid crystal display device, which includes a first substrate, a second substrate, a first vertical electrode, a second vertical electrode, a first pixel electrode, a first counter electrode, a second pixel electrode, a second counter electrode, and a liquid crystal layer. The second substrate is disposed to be opposite to the first substrate, the liquid crystal layer is interposed between the first and second substrates. The liquid crystal layer includes polymer stabilized positive blue phase liquid crystal. The first pixel electrode and the first counter electrode are both at an inner side of the first substrate, and face the second substrate. The first pixel electrode and the first counter electrode have different electrical potentials. The first pixel electrode and the first counter electrode provide a horizontal electric field parallel to the surfaces of the first substrate and the second substrate. The second vertical electrode and the second counter electrode are both at an inner side surface of the second substrate and face the first substrate. The second pixel electrode and the second counter electrode have different electrical potentials. The horizontal electric field includes the electric field generated by the second pixel electrode and the second counter electrode. The second pixel electrode is disposed to corresponding to the first counter electrode; the second counter electrode is disposed to corresponding to the first pixel electrode. The second pixel electrode and the first counter electrode, the second counter electrode and the first pixel electrode respectively generate vertical electric fields perpendicular to the first and second substrates.

Accordingly, the present invention employs at least one pair of electrodes to provide a horizontal electric field for driving the polymer stabilized positive blue phase liquid crystal to increase the light transmittance thereby controlling the brightness of liquid crystal display devices. In addition, the present invention also employs at least one pair of electrodes to provide a vertical electric field for compensating the optical isotropy of the polymer stabilized positive blue phase liquid crystal such that the polymer stabilized positive blue phase liquid crystal have excellent optical isotropy characteristic when there is no horizontal electric field is applied. As a result, light leakage in the dark state is greatly reduced.

Other aspects, details, and advantages of the present display device are further described accompanying with preferred embodiments and figures as follows.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present invention utilizes the double-sided electrode design to produce horizontal and vertical electric fields in liquid crystal cell. The horizontal electric field enables the liquid crystal cell to display an excellent bright state, and the vertical electric field enables the liquid crystal cell to display an excellent dark state. Hereinafter, the liquid crystal display device of the present invention will be described in detail referring to embodiments accompanying with figures. However, the illustrated embodiments are not intended to be used to limit the scope of the present invention, and the description of the structure and operating procedure are not intended to be used to limit the operation procedure of the present invention. Any structure obtained from re-assembling the features and having equivalent functions are both the scope of the present invention. The figures are illustrative and are not drawn according to actual scales.

Figure 4:
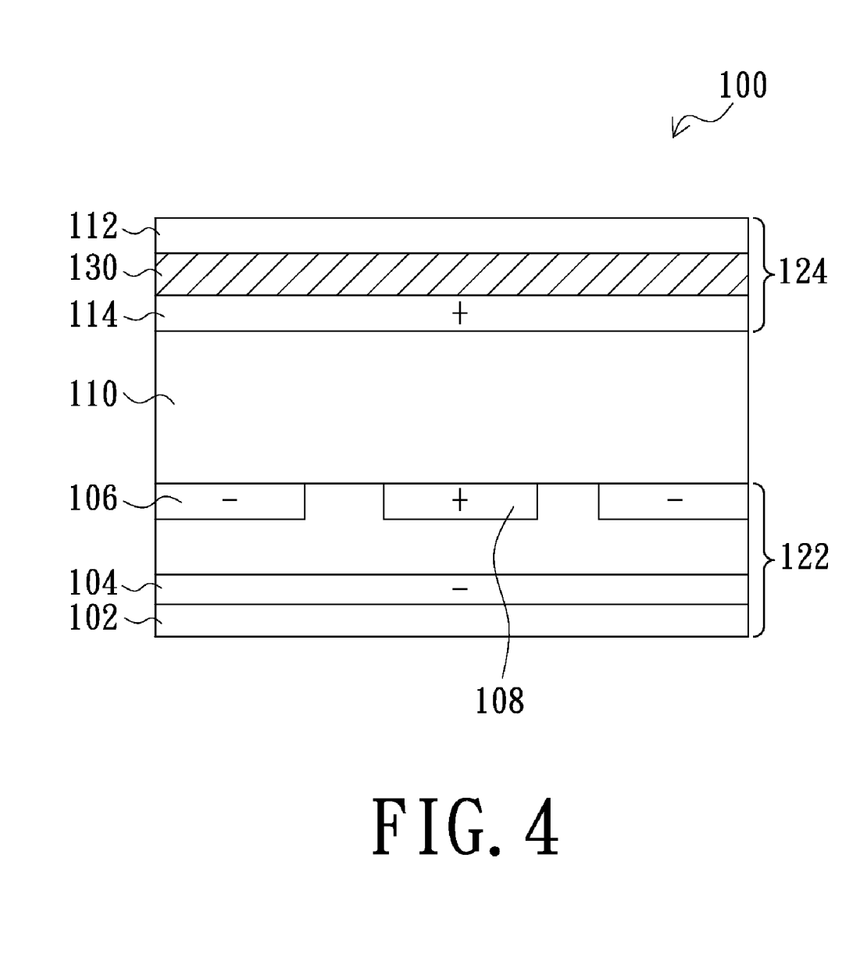
FIG. 4 is a schematic view showing the structure and the driving manner of a liquid crystal display device in accordance with a first embodiment of the present invention.

FIG. 4 is a schematic view showing the structure and the driving manner of a liquid crystal display device in accordance with a first embodiment of the present invention. However, the practical structure and the driving manner are not limited as illustrated in FIG. 4. As shown FIG. 4, the present embodiment provides a liquid crystal device 100, which includes a first transparent substrate 102, a second transparent substrate 112, a color filter layer 130, a first vertical electrode 104, a second vertical electrode 114, a first pixel electrode 106, a first counter electrode 108, and a liquid crystal layer 110. The second transparent substrate 112 is opposite to the first transparent substrate 102, and the liquid crystal layer 110 is interposed between the first transparent substrate 102 and the second transparent substrate 112. According to the first embodiment, the liquid crystal layer 110, for example, can include polymer stabilized positive blue phase liquid crystal, and more specifically, the polymer stabilized positive blue phase liquid crystal of the liquid crystal layer 110 demonstrates optical isotropic characteristic when there is no horizontal electric field is applied and demonstrates optical anisotropic characteristic when there is horizontal electric field is applied. In addition, the electrodes of the first embodiment of the present invention can be made of transparent electrically conductive material such as indium tin oxide (ITO), indium zinc oxide (IZO) and electrically conductive polymer such as poly(3,4-ethylenedioxythiophene) (PEDOT) according to requirements of practical products. However, the material used to form the electrodes are not limited as listed above, and practically, the electrodes of the first embodiment of the present invention can be made of any material having good conductivity.

The first vertical electrode 104, the first pixel electrode 106 and the first counter electrode 108 can all be at an inner side of the first transparent substrate 102, and face the second transparent substrate 112. In addition, thin film transistor (TFT) and related circuit structure (not shown) such as scanning lines, gate insulator, channel layer, data lines, drain electrodes, protective layer can be formed on the first transparent substrate 102. Accordingly, the first transparent substrate 102, the first vertical electrode 104, the first pixel electrode 106, the first counter electrode 108, and the TFT and the related circuit structure form a TFT array substrate 122.

The second vertical electrode 114 is at an inner side of the second transparent substrate 112, and faces the first vertical electrode 104. The second vertical electrode 114, for example, can include a plane shaped conductive layer spanning across the first pixel electrode 106 and the first counter electrode 108. A black matrix (BM, not shown) is formed on the second transparent substrate 112 to define the area corresponding to a pixel region and mask the portion other than the display area for avoiding light leakage at the side. As such, the second transparent substrate 112, the color filter layer 130, the second vertical electrode 114, and the BM on the second transparent substrate 112 form the color filter substrate 124. In other embodiments, as known by one of ordinary skill in the art, the color filter layer 130 and the BM can also be formed on the first transparent substrate 102 to achieve light filtering effect. During the operation of the liquid crystal display device 100, the second vertical electrode 114 can be provided with a constant electrical potential, for example, can be provided with a positive electrical potential such that there is no need to use the TFT to switch signals corresponding to individual pixel area. For example, the second vertical electrode 114 can be the common electrode. Therefore, it is not necessary to employ a TFT array in the color filter substrate 124 of the liquid crystal display device 100, and thus the liquid crystal display device 100 has simplified structure, manufacturing process, and operating manner. In addition, the first counter electrode 108 has different electrical potential with the second vertical electrode 114. For example, the first counter electrode 108 can be provided with a negative electrical potential. However, it is not limited to do so.

Because the second vertical electrode 114 and the first vertical electrode 104 have different electrical potentials thus a vertical electrical field is generated between the second vertical electrode 114 and the first vertical electrode 104. The vertical electric field of the present invention is perpendicular to the first transparent substrate 102 and the second transparent substrate 112, and is used to compensate the optical isotropic characteristic of the polymer stabilized positive blue phase liquid crystal such that the polymer stabilized positive blue phase liquid crystal has excellent optical isotropic characteristic when there is no horizontal electric field is applied thereby efficiently reducing the light leakage in dark state.

When the liquid crystal display device 100 works, the first counter electrode 108 does not need to use TFT to switch signals corresponding to individual pixel area. For example, the first counter electrode 108 can be, but not limited to be, a common electrode. More specifically, the first vertical electrode 104 can include a plane shaped conductive layer, and is at an outer side of the fist pixel electrode 106 and the first counter electrode 108. The first vertical electrode 104 spans across the first pixel electrode 106 and the first counter electrode 108. The first vertical electrode 104 can be provided with a negative, but not limited to negative, electrical potential. The first pixel electrode 106 and the first counter electrode 108 can be between the second vertical electrode 114 and the first vertical electrode 104. The first pixel electrode 106 and the first counter electrode 108 have the same or similar distance from the liquid crystal layer. For example, the first pixel electrode 106 and the first counter electrode 108 can be formed with a conductive layer by a same patterning process. The first pixel electrode 106 and the first counter electrode 108 can respectively include finger shaped electrode, and are alternately arranged. The first pixel electrode 106 and the first counter electrode 108 have different electrical potentials. For example, in the present embodiment, the first pixel electrode 106 and the first counter electrode 108 can be respectively provided with negative electrical potential and positive electrical potential.

Figure 5:
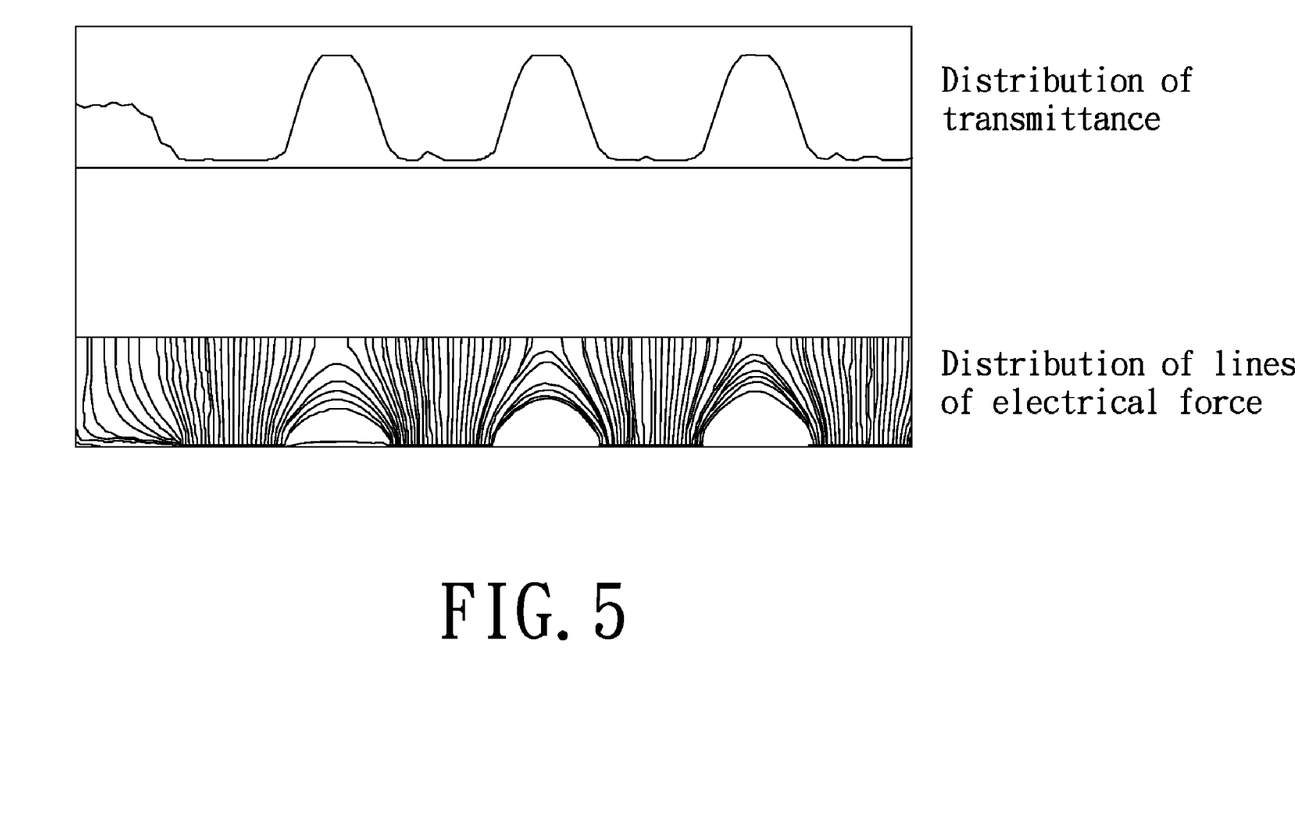
FIG. 5 is a schematic view showing the distribution of the light transmittance and line of electrical force of the liquid crystal display device 100 of FIG. 4.

Because the first pixel electrode 106 and the first counter electrode 108 can provide a horizontal electric field, and thus the liquid crystal display device 100 can have an in-plane switch typed horizontal electric field. Referring together to FIGS. 4 and 5, FIG. 5 is a schematic view showing the distribution of the light transmittance and line of electrical force of the liquid crystal display device 100 of FIG. 4. The horizontal electric field generated by the first pixel electrode 106 and the first counter electrode 108 is parallel to the first transparent substrate 102 and the second transparent substrate 112, and is used to drive the polymer stabilized positive blue phase liquid crystal thereby increasing the light transmittance to control the brightness of liquid crystal display devices. The liquid crystal display device 100 can utilize the TFT in the TFT array substrate 122 to control whether the first pixel electrode 106 is electrically connected, and the voltage applied to the first pixel electrode 106 thereby controlling the brightness and color displayed by each pixel area.

According to the position of the electrodes in FIG. 4 and the voltage applied to the electrodes, it is noted that the horizontal electric field of the present invention is not limited to only include the electric field generated between the first pixel electrode 106 and the first counter electrode 108. For example, in varied embodiments, when the electrical potentials applied to the first pixel electrode 106 and the first vertical electrode 104 are different, the first pixel electrode 106 and the first vertical electrode 104 also contribute a part of the horizontal electric field. In addition, the vertical electric field is also not limited to only include the electric field between the first vertical electrode 104 and the second vertical electrode 114. For example, when the electrical potential of the first pixel electrode 106 or the first counter electrode 108 is different with the electrical potential of the second vertical electrode 114, the first pixel electrode 106 or the first counter electrode 108 and the second vertical electrode 114 can also contribute a part of the vertical electric field. Therefore, in summary, the liquid crystal display device 100 of the present embodiment can provide better display effect.

As shown in FIG. 5, at the gentle portion of the lines of electric force, in other words, at where the horizontal electric field play a main role, the polymer stabilized positive blue phase liquid crystal intend to demonstrate optical anisotropic characteristic, and thus the polymer stabilized positive blue phase liquid crystal has higher light transmittance and shows a bright state. In comparison, when there is no horizontal electric field, the polymer stabilized positive blue phase liquid crystal intend to demonstrate optical isotropic characteristic, and thus the polymer stabilized positive blue phase liquid crystal has lower light transmittance and shows a dark state.

Figure 6:
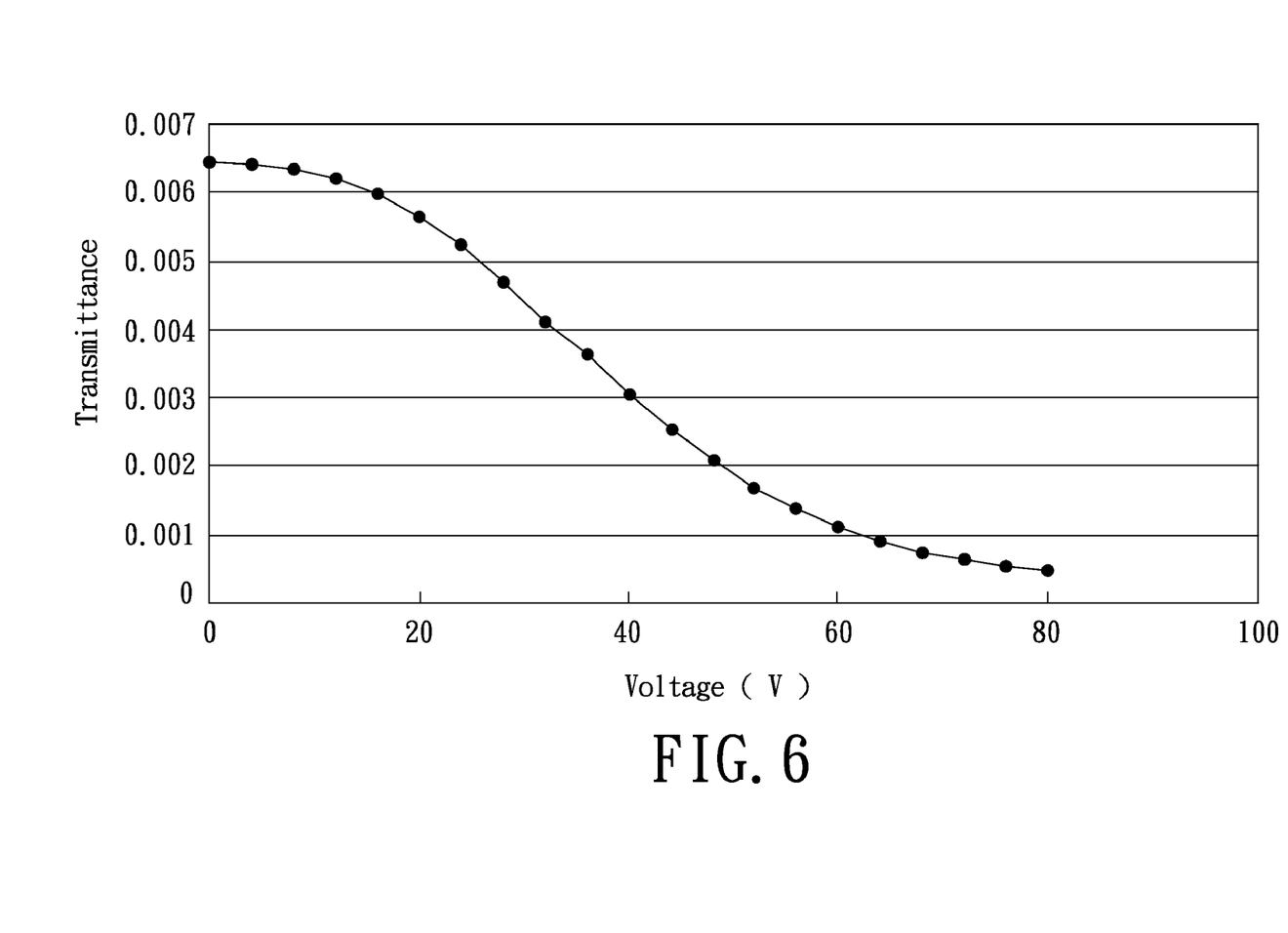
FIG. 6 is a schematic view showing a relation of vertical voltage difference and the light transmittance of the liquid crystal display device 100 of FIG. 4 in the dark state

Referring to FIG. 6, FIG. 6 is a schematic view showing a relation of vertical voltage difference and the light transmittance of the liquid crystal display device 100 of FIG. 4 in the dark state, wherein the horizontal axis represents the vertical voltage difference between the first vertical electrode 104 and the second vertical electrode 114, and the vertical axis represents the light transmittance of the polymer stabilized positive blue phase liquid crystal in the liquid crystal layer 110. When there is no horizontal electric field is provided, the liquid crystal display device 100 ideally should show a dark state, in other words, the light transmittance is near zero. Actually, as shown in FIG. 6, if there is no voltage difference between the first vertical electrode 104 and the second vertical electrode 114, the polymer stabilized positive blue phase liquid crystal still has the light transmittance of about 0.65% which leads to light leakage. As the vertical voltage difference between the first vertical electrode 104 and the second vertical electrode 114 increases, the intensity of the vertical electric field also increases, the polymer stabilized positive blue phase liquid crystal has better optical isotropic characteristic and the light transmittance also decreases such that the light leakage is reduced. When the vertical voltage difference between the first vertical electrode 104 and the second vertical electrode 114 approaches to about 80 volts, the light transmittance of the polymer stabilized positive blue phase liquid crystal is decreased to below 0.05%, and the polymer stabilized positive blue phase liquid crystal demonstrate excellent optical isotropic characteristic. At the same time, the contrast ratio increase from 23 to 302.

Figure 7:
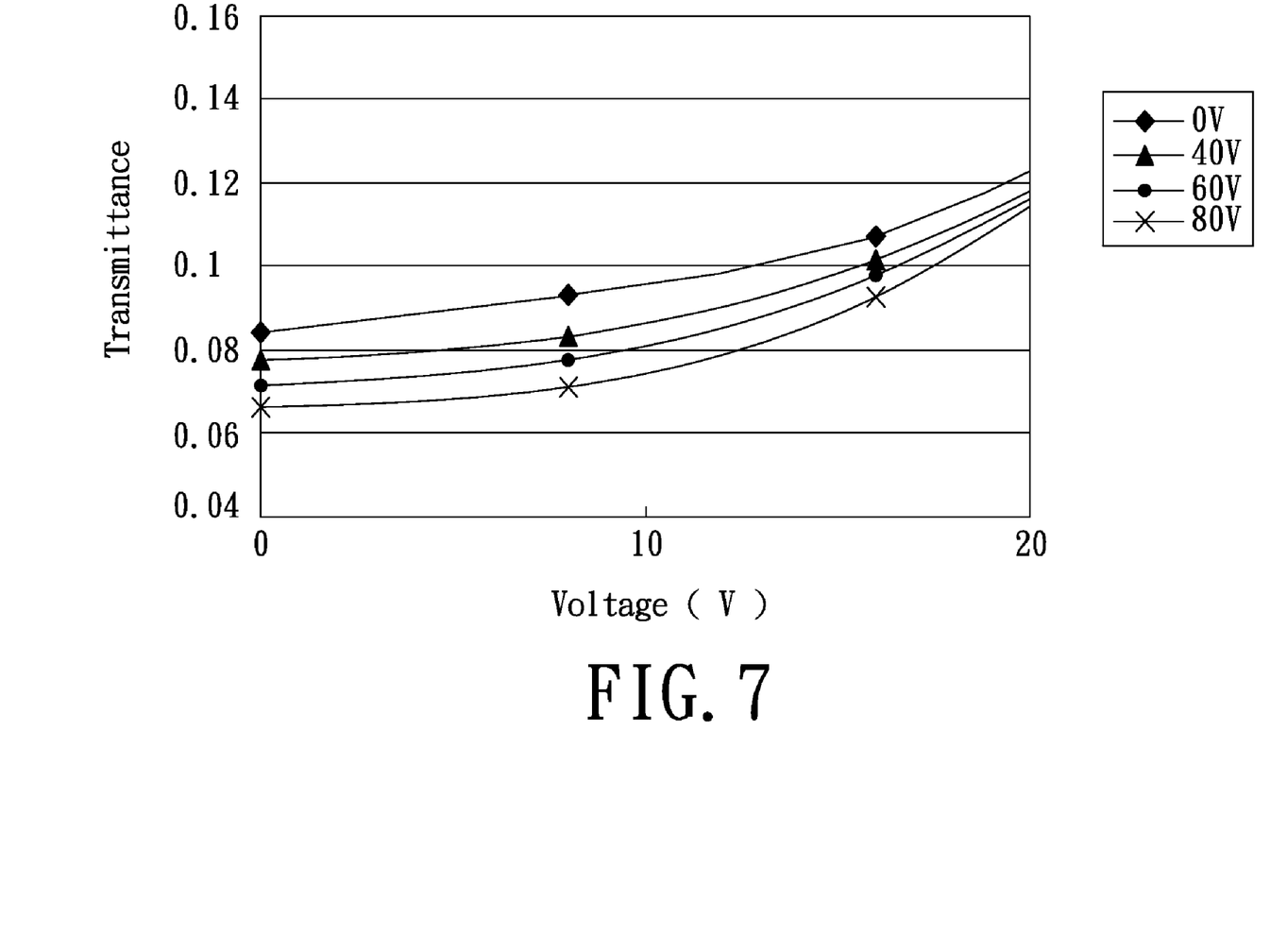
FIG. 7 is a schematic view showing a relation of horizontal voltage difference and the light transmittance of the liquid crystal display device 100 of FIG. 4.

FIG. 7 is a schematic view showing a relation of horizontal voltage difference and the light transmittance of the liquid crystal display device 100 of FIG. 4, wherein the horizontal axis represents the horizontal voltage difference between the first pixel electrode 106 and the first counter electrode 108, and the vertical axis represents the light transmittance of the polymer stabilized positive blue phase liquid crystal in the liquid crystal layer 110. FIG. 7 shows four curved lines, which respectively represent the relation when the vertical voltage difference between the first vertical electrode 104 and the second vertical electrode 114 is 0V, 40V, 60V, and 80V. According to the practically measure data, the liquid crystal display device 100 of the present embodiment can all demonstrate ideal light transmittance in the voltage range form 0V to 80V. Specially, as shown in FIG. 7, when the horizontal voltage difference is near 0V, the vertical electric field can efficiently reduce light leakage in the dark state such that the contrast ratio is improved by 27%.

Figure 8:
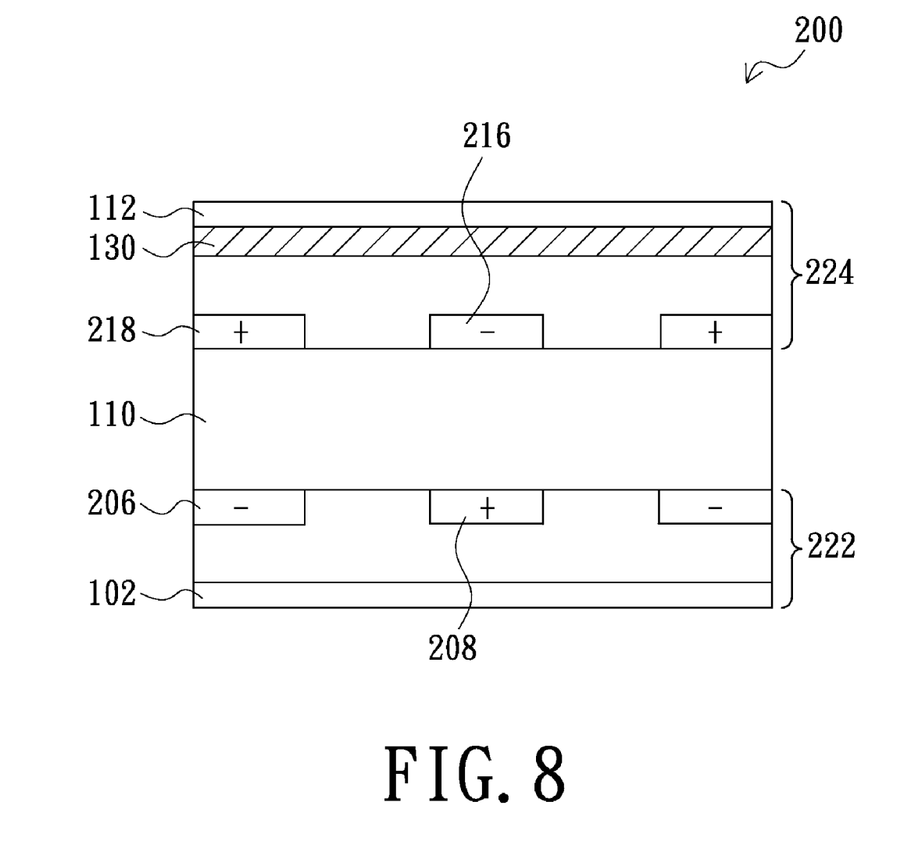
FIGS. 8 to 10 are schematic view respectively showing the structure and the driving manner of a liquid crystal display device in accordance with the second to fourth embodiments.
Figure 9:
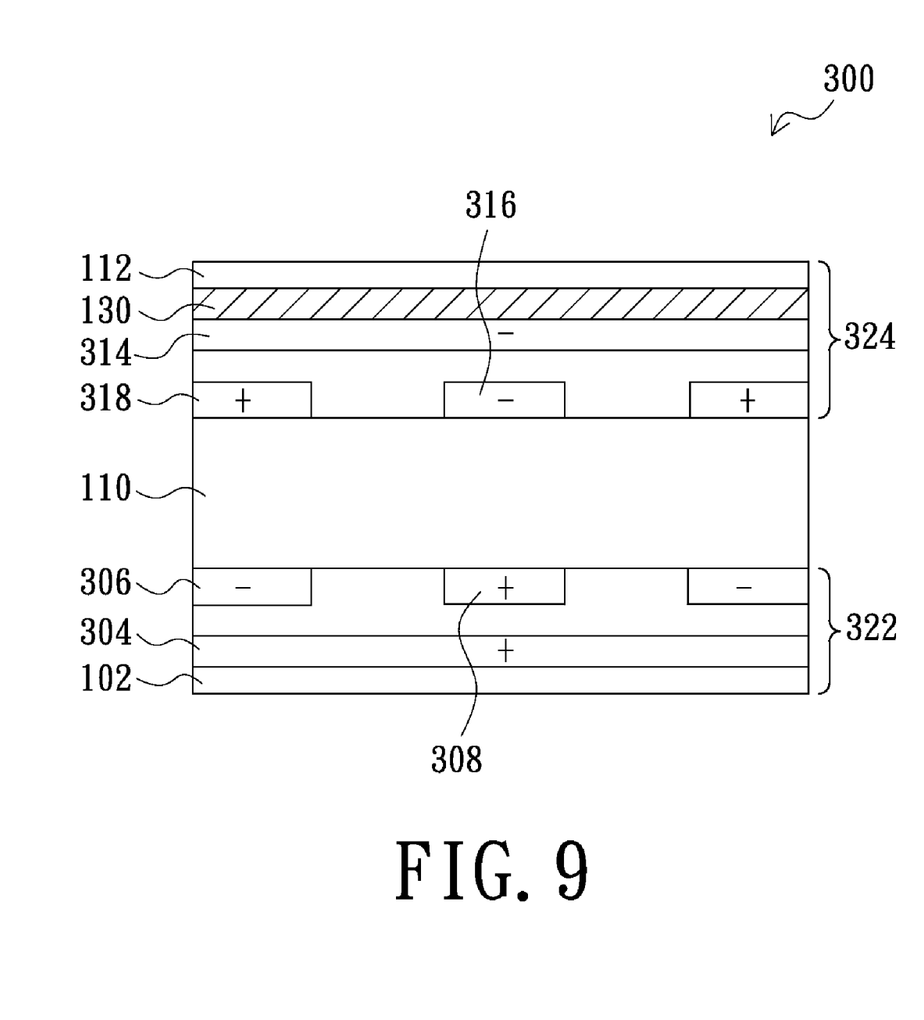
Figure 10:
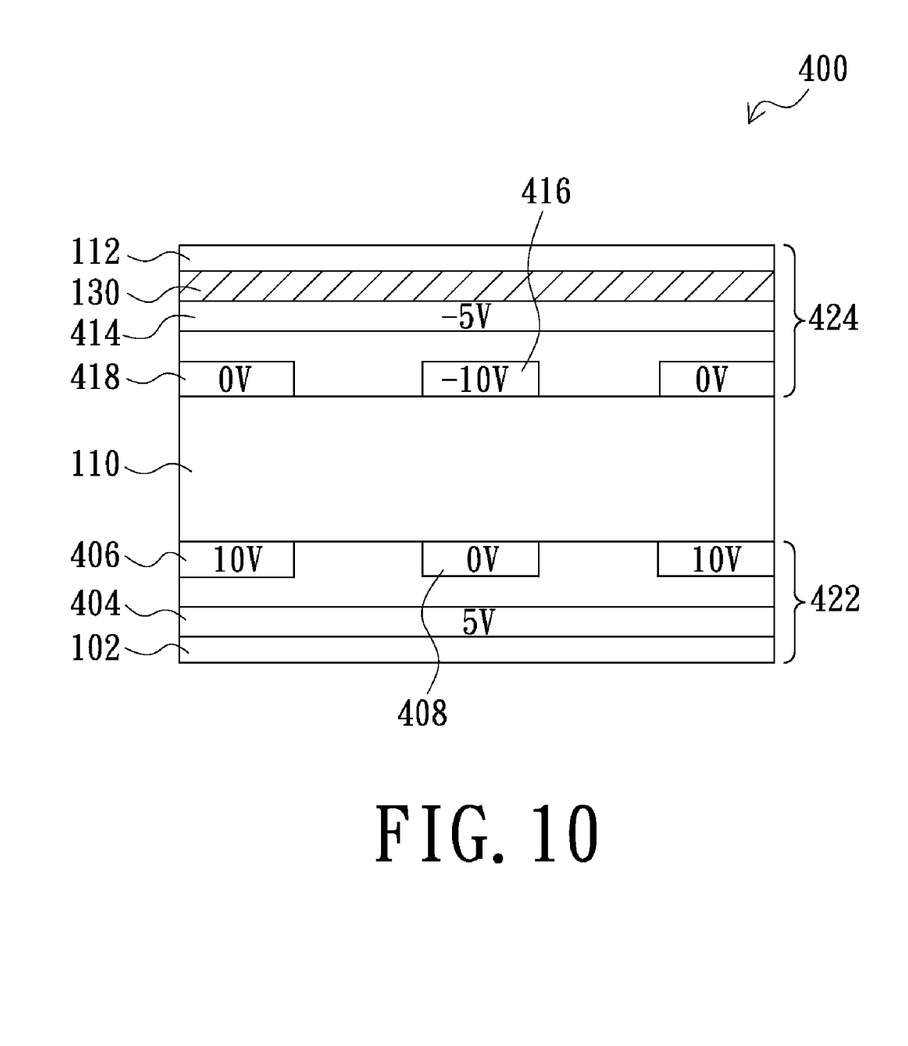

According to the liquid crystal display device and the driving manner of the present embodiment, the present embodiment mainly utilizes the double-sided electrode design to produce horizontal and vertical electric fields in liquid crystal cells thereby efficiently controlling the light transmittance of the polymer stabilized positive blue phase liquid crystal, and thus the structure of the liquid crystal display device is not limited as aforementioned. Referring to FIGS. 8 to 10, FIGS. 8 to 10 are respectively schematic views showing the structure and the driving manner of the liquid crystal display device in accordance with the second to the fourth embodiments. The same components or parts in the figures are represented with the same reference numerals. The second to the fourth embodiments can all have the first transparent substrate 102, the second transparent substrate 112, the color filter layer 130, and the liquid crystal layer 110 same to that of the first embodiment, and other similar or same structure are not described for brief purpose.

As shown in FIG. 8, the second embodiment mainly differs from the first embodiment in that the present invention has a double layer in-plane switching (IPS) horizontal electric field. That is, the second embodiment can have electrodes different with the first vertical electrode 104 and the second vertical electrode 114. In the present embodiment, the color filter substrate 224 includes a second pixel electrode 216 and a second counter electrode 218. The second pixel electrode 216 and the second counter electrode 218 are both at the inner side of the second transparent substrate 112, and face the first transparent substrate 102. The second pixel electrode 216 and the second counter electrode 218 have same or similar interval with the liquid crystal layer 110. For example, the second pixel electrode 216 and the second counter electrode 218 can respectively include finger shaped electrodes, and are alternately arranged. In addition, the second pixel electrode 216 is opposite to the first counter electrode 208, and the second counter electrode 218 is opposite to the first pixel electrode 206, and thus can respectively provides a vertical electric field.

When the liquid crystals display device 200 works, the first counter electrode 208 and the second counter electrode 218 can be continuously provided with constant electrical potentials. For example, in the present embodiment, the first counter electrode 208 and the second counter electrode 218 can be both provided with positive, but not limited to positive, electrical potentials such that it is not necessary to employ TFT to switch signals corresponding to individual pixel area. The liquid crystal display device 200 utilizes the TFT in the TFT array substrate 222 to control whether to electrically conduct the first pixel electrode 206, and the color filter substrate 224 can also include additional TFT to control whether the second pixel electrode 216 is electrically conducted. When electrically conducted, the first pixel electrode 206 and the second pixel electrode 216, for example, can be provided with negative electrical potentials.

The second counter electrode 218 is disposed to corresponding to the first pixel electrode 206, and the second pixel electrode is disposed to corresponding to the first counter electrode 208. Because the second counter electrode 218 and the first pixel electrode 206 have different electric potentials, and the first counter electrode 208 and the second pixel electrode 216 also have different electrical potentials. Vertical electric fields are respectively generated between the first counter electrode 208 and the second pixel electrode 216, and between the second counter electrode 218 and the first pixel electrode 206.

On the other hand, because the first pixel electrode 206 and the first counter electrode 208 can have different electrical potentials, and the second pixel electrode 216 and the second counter electrode 218 can also have different electrical potentials. Horizontal electric fields can be respectively generated between the first pixel electrode 206 and the first counter electrode 208, and between the second pixel electrode 216 and the second counter electrode 218. Thus, the double sided electrode design can also improve the transmittance of the polymer stabilized positive blue phase liquid crystal.

As shown in FIG. 9, the third embodiment mainly differs from the first embodiment in that the present embodiment has a fringe field switching (FFS) horizontal electric field. That is, the color filter substrate 324 of the third embodiment can include a second pixel electrode 316 and a second counter electrode 318. The second pixel electrode 316 and the second counter electrode 318 are both at the inner side of the second transparent substrate 112, and face the first transparent substrate 102. In addition, the second pixel electrode 316 and the second counter electrode 318 can be disposed between the second vertical electrode 314 and the first vertical electrode 304. For example, the second pixel electrode 316 and the second counter electrode 318 can respectively include finger shaped electrodes, and are alternately arranged. The first vertical electrode 304, the first counter electrode 308, and the second counter electrode 318, for example, can be provided with positive electrical potentials, and the second vertical electrode 314, for example, can be provided with a negative electrical potentials. As such, the liquid crystal display device 300 of the present embodiment does not need to utilize the TFT to switch signals corresponding to individual pixel area. The liquid crystal display device 300 can utilize the TFT in the TFT array substrate 322 to control whether to electrically conduct the first pixel electrode 306, and the color filter substrate 324 can also include additional TFT to control whether the second pixel electrode 316 is electrically conducted.

Vertical electric fields can be respectively generated between the first vertical electrode 304 and the second vertical electrode 314, between the second pixel electrode 316 and the first counter electrode 308, and between the second counter electrode 318 and the first pixel electrode 306. Horizontal electric fields can be respectively generated between the first vertical electrode 304 and the first counter electrode 308, between the second vertical electrode 314 and the second counter electrode 318, between the first pixel electrode 306 and the first counter electrode 308, and between the second pixel electrode 316 and the second counter electrode 318.

As shown in FIG. 10, similar to the third embodiment, the fourth embodiment also has a FFS horizontal electric field, and the fourth embodiment mainly differs from the third embodiment in that the voltage applied to a first vertical electrode 404, a second vertical electrode 414, a first pixel electrode 406, a first counter electrode 408, a second pixel electrode 416, and a second counter electrode 418. For example, the electrical potentials of the first counter electrode 408 and the second counter electrode 418 of the liquid crystal display device 400 are both equal to zero, the electrical potentials of the first vertical electrode 404 and the first electrode 406 are both positive and the electrical potential of the first vertical electrode 404 is lower than that of the first pixel electrode 406. For example, the electrical potentials of the first vertical electrode 404 and the first pixel electrode 406 are respectively 5V and 10V. The electrical potentials of the second vertical electrode 414 and the second pixel electrode 416 can be negative, and the electrical potential of the second vertical electrode 414 is greater than that of the second pixel electrode 416. For example, the electrical potentials of the second vertical electrode 414 and the second pixel electrode 416 can respectively be −5V and −10V.

As such, vertical electric fields can be generated between the first vertical electrode 404 and the second vertical electrode 414, between the second pixel electrode 416 and the first counter electrode 408, and between the second counter electrode 418 and the first pixel electrode 406; horizontal electric fields can be generated between the first vertical electrode 404 and the first counter electrode 408, between the vertical electrode 414 and the second counter electrode 418, between the first pixel electrode 406 and the first counter electrode 408, and between the second pixel electrode 416 and the second counter electrode 418.

In addition, the structure and the driving manner of the present invention are not limited as above embodiments. For example, in other embodiments, the voltage, shape, or position of the first vertical electrode, the second vertical electrode, the first pixel electrode, the first counter electrode, the second pixel electrode and the second counter electrode can be varied according to practical requirements.

In summary, the present invention employs the design of electrode structure to produce vertical electrical fields and horizontal electrical fields to compensate the optical isotropic characteristic of the polymer stabilized positive blue phase liquid crystal. As the intensity of the horizontal electric fields increases, light leakage in the dark state is reduced and the contrast ratio is improved. As such, the liquid crystal display device of the present invention not only has the advantage of the polymer stabilized positive blue phase liquid crystal such as fast response time and wide working temperature range, but also can reduce light leakage in the dark state of the polymer stabilized positive blue phase liquid crystal such that the contrast ratio can be improved. Therefore, the display effect of the liquid crystal display device is efficiently improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A liquid crystal display device, comprising:
a first substrate;
a second substrate, disposed to be opposite to the first substrate;
a first vertical electrode, disposed at an inner side of the first substrate and facing the second substrate;
a second vertical electrode, disposed at an inner side of the second substrate and facing the first vertical electrode, the electrical potentials of the second vertical electrode and the first vertical electrode being different thereby generating a vertical electric field perpendicular to the first substrate and the second substrate;
a first pixel electrode, disposed at an inner side of the first substrate and facing the second substrate;
a first counter electrode, disposed at the inner side of the first substrate, the electrical potentials of the first pixel electrode and the first electrode being different thereby generating a horizontal electric field between the first pixel electrode and the first counter electrode, the horizontal electric field being parallel to the first and second substrates; and
a liquid crystal layer, disposed between the first and second substrate, the liquid crystal layer comprising a polymer stabilized positive blue phase liquid crystal.

2. The liquid crystal display device of claim 1, wherein the first pixel electrode and the first counter electrode are disposed between the second vertical electrode and the first vertical electrode.

3. The liquid crystal display device of claim 1, wherein the first pixel electrode and the first counter electrode respectively comprises a finger shaped electrode, and are alternately arranged.

4. The liquid crystal display device of claim 3, wherein the first vertical electrode and the second vertical electrode respectively comprise a plane shaped conductive layer.

5. The liquid crystal display device of claim 4, wherein the first vertical electrode and the first pixel electrode have negative electrical potentials and the second vertical electrode and the first counter electrode have positive electrical potentials.

6. The liquid crystal display device of claim 4, further comprising:
a second pixel electrode, disposed at an inner side of the second substrate and facing the first substrate; and
a second counter electrode, disposed at the inner side of the second substrate and facing the first substrate, wherein the electrical potentials of the second pixel electrode and the second counter electrode being different, the horizontal electric field comprising an electrical field generated between the second pixel electrode and the second counter electrode.

7. The liquid crystal display device of claim 6, wherein the second pixel electrode and the second counter electrode are disposed between the second vertical electrode and the first vertical electrode.

8. The liquid crystal display device of claim 7, wherein the second pixel electrode and the second counter electrode respectively comprises a finger shaped electrode, and are alternately arranged.

9. The liquid crystal display device of claim 8, wherein the second counter electrode is disposed corresponding to the first pixel electrode, and the second counter electrode and the first pixel electrode have different electrical potentials.

10. The liquid crystal display device of claim 9, wherein the first counter electrode is disposed corresponding to the second pixel electrode, and the first counter electrode and the second pixel electrode have different electrical potentials.

11. The liquid crystal display device of claim 10, wherein the first vertical electrode, the first counter electrode and the second counter electrode have positive electrical potentials, and the second vertical electrode, the first pixel electrode and the second pixel electrode have negative electrical potentials.

12. The liquid crystal display device of claim 10, wherein the electrical potential of the first and second counter electrodes are both equal to zero.

13. The liquid crystal display device of claim 11, wherein the first vertical electrode and the first pixel electrode both have positive electrical potentials, and the electrical potential of the first vertical electrode is lower than that of the first pixel electrode.

14. The liquid crystal display device of claim 12, wherein the second vertical electrode and the second pixel electrode both have negative electrical potentials, and the electrical potential of the second vertical electrode is greater than that of the second pixel electrode.

15. The liquid crystal display device of claim 1, wherein the first counter electrode is disposed at the inner side of the second substrate and faced the first substrate.

16. The liquid crystal display device of claim 15, wherein the second vertical electrode, the first vertical electrode, the first pixel electrode, and the first counter electrode respectively comprises a finger shaped electrode.

17. The liquid crystal display device of claim 16, wherein the second vertical electrode and the first counter electrode are alternately arranged, and the first vertical electrode and the first pixel electrode are alternately arranged.

18. The liquid crystal display device of claim 17, wherein the horizontal electric field comprises an electric field generated between the first vertical electrode and the first pixel electrode and an electric field generated between the second vertical electrode and the first counter electrode.

19. The liquid crystal display device of claim 18, wherein the first vertical electrode and the first counter electrode have positive electrical potentials, and the second vertical electrode and the first pixel electrode have negative electrical potentials.

20. A liquid crystal display device, comprising:
a first substrate;
a second substrate, dispose to be opposite to the first substrate;
a first pixel electrode, disposed at an inner side of the first substrate and facing the second substrate;
a first counter electrode, disposed at the inner side of the first substrate, the first pixel electrode and the first counter electrode having different electrical potentials, the first pixel electrode and the first counter electrode providing a horizontal electric field parallel to surfaces of the first and second substrates;
a second pixel electrode, disposed at an inner side of the second substrate and facing the first substrate;
a second counter electrode, disposed at the inner side of the second substrate and facing the first substrate, the second pixel electrode and the second counter electrode having different electrical potentials, and the horizontal electric field comprising an electric field generated between the second pixel electrode and the second counter electrode,
the second pixel electrode being disposed corresponding to the first counter electrode, the second counter electrode being disposed corresponding to the first pixel electrode, the second pixel electrode and the first counter electrode, and the second counter electrode and the first pixel electrode respectively generating a vertical electrical field perpendicular to the first and second substrates; and
a liquid crystal layer, disposed between the first and the second substrate, the liquid crystal layer comprising a polymer stabilized positive blue phase liquid crystal.

21. The liquid crystal display device of claim 20, wherein the first pixel electrode and the first counter electrode respectively comprises a finger shaped electrode, and are alternately arranged.

22. The liquid crystal display device of claim 21, wherein the second pixel electrode and the second counter electrode respectively comprises a finger shaped electrode, and are alternately arranged.

23. The liquid crystal display device of claim 22, wherein the first pixel electrode and the second pixel electrode have negative electrical potentials and the first counter electrode and the second counter electrode have positive electrical potentials.

* * * * *